July 4, 1939.  C. J. KOHLER  2,164,927

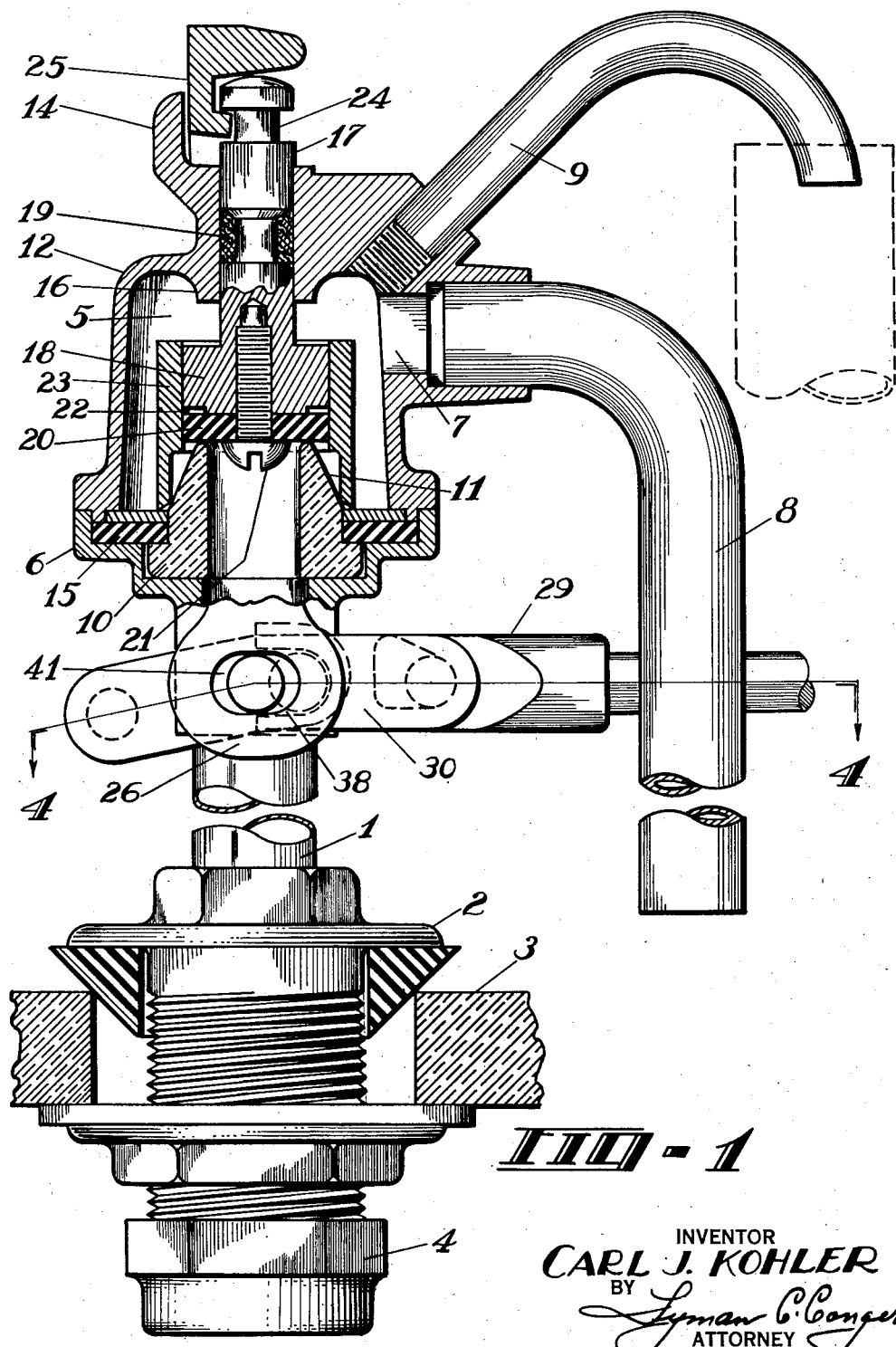

FLOAT VALVE

Filed Aug. 11, 1938  2 Sheets-Sheet 2

INVENTOR
CARL J. KOHLER
BY Lyman C. Conger
ATTORNEY

Patented July 4, 1939

2,164,927

UNITED STATES PATENT OFFICE 2,164,927

FLOAT VALVE

Carl J. Kohler, Kohler, Wis.

Application August 11, 1938, Serial No. 224,236

6 Claims. (Cl. 137—104)

Figure 3:
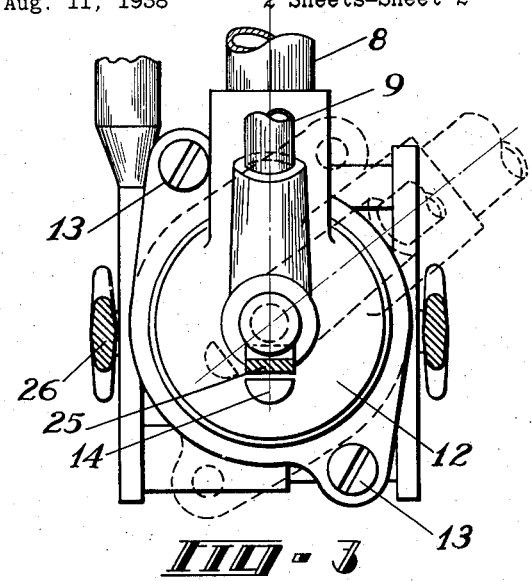
Figure 4:
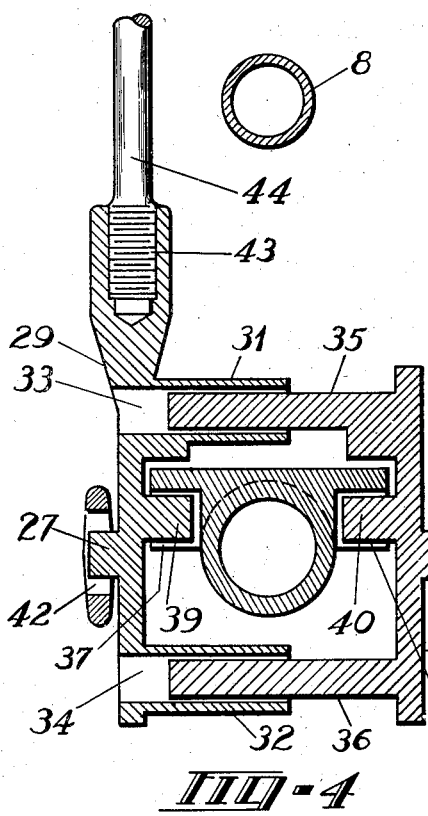
Figure 2:
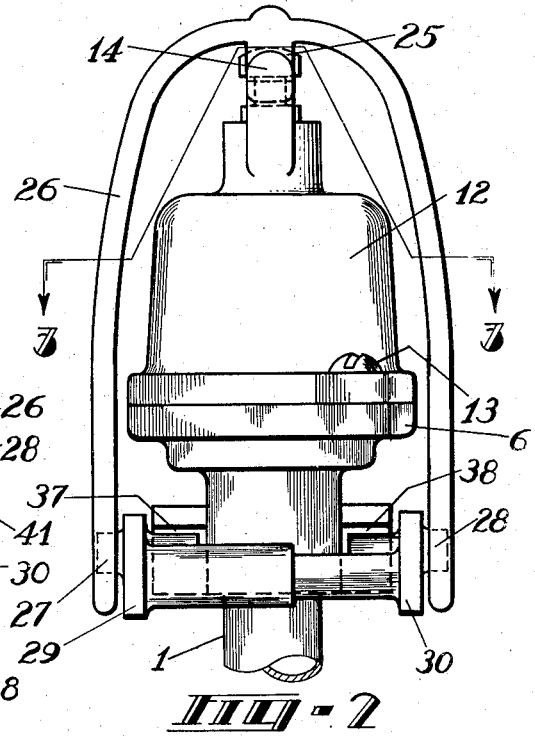

My invention relates to improvements in float valves, and the objects of my invention are, first, to provide a float valve which will be satisfactory and quiet in operation; second, to provide such a float valve which will be economical to manufacture and requires only a minimum of machining; and, third, to provide a float valve which may readily be assembled and disassembled.
With the foregoing and related objects in view, the invention consists in the mechanism illustrated in the accompanying drawings, in which Figure 1 is a side view, partly in section, of a float valve constructed in accordance with the invention; Figure 2, a front view; and Figure 3, a plan view thereof; and Figure 4, a sectional view taken along the lines 4—4 of Figure 1.

This application is a continuation in part of my co-pending application, Serial No. 187,644, filed January 29, 1938.

In the embodiment illustrated an inlet tube 1 is provided with means 2 for attachment to a flush tank 3 and means 4 for connection to a supply pipe.
The inlet tube 1 is connected to and adapted to discharge into the chamber 5 of the valve body 6. The valve body 6 is provided with a discharge port 7, leading to a discharge tube 8, and with the conventional refill tube 9.
The valve body 6 is provided with a tubular valve seat 10. The valve seat 10 has a beveled exterior portion or shoulder 11 for a purpose hereinafter described.

The upper portion of the body 6 is formed by a cap 12 attached in any suitable manner as by screws 13 and provided with an upstanding lug 14. The cap 12 is also provided with a guide sleeve 16 adapted to receive the stem 17 of a valve 18. The stem 17 is grooved to receive packing 19 to prevent the flow of fluid between the stem 17 and the sleeve 16.

The valve 18 is provided with a valve washer 20 of rubber or similar resilient material secured in position by a screw 21. The valve 18 has a shallow circumferential groove 22 extending around its periphery so that the circumferential portion of the washer 20 is spaced from the valve 18.

An annular sleeve 23 encircles the valve 18 and has a sliding fit thereon. The lower portion of the sleeve 23 is beveled to engage the shoulder 11, as illustrated in Figure 1. When the screw 21 is tightened the washer 20 is expanded and forced against the sleeve 23, thus securing it in its position of adjustment relative to the valve 18.

In assembling the valve the sleeve 23 is positioned on the valve 18 so that, on the downward movement of the valve, it contacts the shoulder 11 before the washer 20 contacts the seat 10. The assembly is then pushed down upon the seat by means of the valve stem 17, causing the valve 18 to slide downwardly until the washer 20 contacts the seat 10. Thus the valve closes and the flow is restricted at two points, the juncture of the washer 20 with the seat 10 and the juncture of the sleeve 23 with the shoulder 11. It will be noted that, after the initial adjustment, the valve closes simultaneously at these two points.

It is well known that a more quiet action results when the valve closes simultaneously at more than one point, as the pressure is reduced gradually. However, to create a valve which has two points of closing, operating simultaneously, has hitherto required a great deal of very accurate machining which is so expensive as to be prohibitive for commercial production. By means of this construction, however, this end may be attained, and a quiet valve produced economically, since the two points of closing are automatically adjusted to close simultaneously.

The groove 22 allows the periphery of the washer 20 to flex somewhat, thus allowing for compression of the washer and also causing it to grip the inside of the sleeve 23 more tightly and act more effectually to prevent further sliding of the sleeve 23 on the valve 18.

The valve stem 17 is provided with an annular, circumferential groove 24 adapted to receive the horizontal position of an L shaped lug 25 depending from the operating yoke 26, which is mounted on pins 27 and 28 extending outwardly, respectively, from the float lever 29 and the float lever link 30 and extending into apertures 41 and 42 in the yoke 26. It will be noted that the apertures 41 and 42 are elongated in shape. The lug 25 is held in engagement with the groove 24 by the lug 14. When it is desired to remove the yoke the screws 13 holding the cap 12 are loosened, the cap rotated until the lug 25 clears the lug 14, as shown by the dotted lines of Figure 3. The yoke 26 may be removed by springing it so as to pass over the pins 27 and 28.

The float lever 29 is provided with a pair of inwardly extending bosses 31 and 32 positioned on opposite sides of the valve body 6 and formed with longitudinally extending apertures 33 and 34 adapted to receive cylindrical bosses 35 and 36 extending inwardly from the float lever link

30 and having a telescopic fit in the bosses 31 and 32.

The body 6 is formed with a pair of U shaped apertures 37 and 38 positioned on opposite sides of the body. The float lever 29 and float lever link 30 are rotatably mounted, respectively, by means of pins 39 and 40 extending into the apertures 37 and 38.

The float lever 29 is threaded at 43 to permit the attachment of a float rod 44. When the float rod 44 is lowered the pins 39 and 40, having a fulcrum at 37 and 38, rotate, giving a partial rotation to the float lever mechanism as a whole, and the pins 27 and 28 are raised, transmitting their action to the yoke 26, thus opening the valve. The reverse action takes place upon the raising of the float rod 44.

It will be noted that as the pins 27, 28 and 39, 40 are cylindrical in shape and the apertures 41, 42 and 37, 38 are substantially elongated in shape, that is, having a longitudinal diameter greater than the transverse diameter, the pins have a rolling action in the apertures. Thus all friction-creating sliding action is eliminated and the valve operating mechanism virtually operates upon roller bearings, resulting in a virtually frictionless and free operating valve.

The whole assembly may be readily disassembled upon removal of the yoke 26 which holds the float lever 29 and float lever link 30 in telescoped relationship.

It will be noted that the entire valve assembly requires very little expensive machining, as most of the parts can be cast as accurately as required for proper operation.

It will be obvious that various changes may be made in the specific details herein disclosed without departing from the substance of the invention; therefore I do not limit myself to said details but claim all structures within the substance of the invention and the scope of the appended claims.

I claim:

1. In a float valve, the combination of a valve body, a cap on said body, a valve stem extending through said cap, a groove in the exterior portion of said valve stem, a yoke pivotally attached to said body, a lug depending from said yoke and having a portion adapted to engage the groove in said valve stem, an upstanding lug on said cap adapted to hold said first mentioned lug in contact with said groove, said second mentioned lug being turned of of engagement with said first mentioned lug when said cap is turned.

2. In a float valve, the combination of a valve body, a cap on said body, a valve stem extending through said cap, a yoke attached to said body and having a portion adapted to operatively engage said valve stem, an upstanding lug on said cap adapted to hold said yoke in operative engagement with said valve stem and being turned out of engagement with said yoke upon turning of said cap from its normal possition.

3. In a float valve, the combination of a valve body, a pair of apertures positioned on opposite sides of said body, a float lever positioned on one side of said body, a float link positioned on the opposite side of said body, said float lever and said float lever link having interlocking portions and portions extending into said body apertures whereby said float lever and said float lever link may be pivotally mounted on said body in interlocked relationship, a yoke fitting over said float lever and said float lever link and adapted to hold said float lever and said float lever link in interlocked relationship, a cap on said body, a valve stem extending through said cap, a portion on said yoke adapted to operatively engage said valve stem, an upstanding lug on said cap adapted to hold said yoke in operative engagement with said valve stem and being turned out of engagement with said yoke so as to allow said yoke to be dis-engaged from said valve stem upon turning of said cap from its normal position.

4. In a float valve, the combination of a valve body, a pair of substantially U shaped apertures positioned on opposite sides of said body, a float lever positioned on one side of said body, a pair of bosses on said float lever extending inwardly toward and on opposite sides of said body, said bosses being provided with longitudinal apertures, a float lever link positioned on the side of the body opposite said float lever, said float lever and said float lever link having retaining portions extending into said U shaped apertures, a pair of bosses on said float lever link extending inwardly toward and on opposite sides of said body and adapted to fit telescopically within said apertures in the float lever and a yoke fitting over said float lever and said float lever link and adapted to hold said float lever and said float lever link in interconnected relationship.

5. In a float valve, the combination of a valve body, a pair of apertures positioned on opposite sides of said body, a float lever positioned on one side of said body, a float lever link positioned on the opposite side of said body, said float lever and said float lever link having interlocking portions and portions extending into said body apertures whereby said float lever and said float lever link may be rotatably mounted on said body in interlocked relationship, and a yoke fitting over said float lever and said float lever link and adapted to hold said float lever and said float lever link in interlocked relationship.

6. In a float valve, the combination of a valve body, a pair of apertures positioned on opposite sides of said body, a float lever positioned on one side of said body, a float lever link positioned on the opposite side of said body, said float lever and said float lever link having interlocking portions, a yoke adapted to fit over said float lever and said float lever link, a pair of apertures in said yoke, a pair of apertures in said body, said apertures in said yoke and body having a longitudinal diameter greater than this transverse diameter, substantially cylindrical pins extending from said float lever and said float lever link into the apertures in said body, and similar pins extending from said float lever and said float lever link into the apertures in said yoke.

CARL J. KOHLER.